United States Patent [19]
Terao et al.

[11] Patent Number: 5,546,754
[45] Date of Patent: Aug. 20, 1996

[54] AIR-CONDITIONING APPARATUS FOR VEHICLE USE

[75] Inventors: Tadayoshi Terao, Toyoake; Katsuya Kusano, Chita-gun, both of Japan

[73] Assignee: Nippondenso Co., Ltd., Kariya, Japan

[21] Appl. No.: 350,133

[22] Filed: Nov. 29, 1994

[30] Foreign Application Priority Data

Dec. 1, 1993 [JP] Japan .................................. 5-301527

[51] Int. Cl.$^6$ ........................................................ B60H 1/00
[52] U.S. Cl. .................................. 62/133; 62/150; 62/244
[58] Field of Search ................................ 62/133, 150, 151, 62/157, 158, 186, 231, 234, 80, 239, 244

[56] References Cited

U.S. PATENT DOCUMENTS

| | | | |
|---|---|---|---|
| 5,033,672 | 7/1991 | Sakamoto et al. | 236/44 A |
| 5,361,593 | 11/1994 | Dauvergne | 62/133 X |

FOREIGN PATENT DOCUMENTS

| | | |
|---|---|---|
| 3836049 | 3/1990 | Germany . |
| 4023046 | 1/1992 | Germany . |
| 54-159759 | 12/1979 | Japan . |
| 59-186723 | 10/1984 | Japan . |
| 538939 | 2/1993 | Japan . |

*Primary Examiner*—Harry B. Tanner
*Attorney, Agent, or Firm*—Cushman, Darby & Cushman

[57] ABSTRACT

The device eliminates water droplets from adhering to an evaporator of an automotive air conditioner after the vehicle as been shut off or stopped. In order to park a vehicle, a vehicle driver switches off an ignition switch device, which also switches off an accessory switch, unfastens a seatbelt, and exits the vehicle. Thereupon, after switching off of the accessory switch, when time t elapses, a control circuit sequentially executes a series of steps to recognize the parked state from the three conditions of switching off of a seatbelt switch, a no-rider signal of a rider sensor, and switching off of a door-lock switch. Thereupon, the control circuit announces operation of a blower by means of a notification device, then sets various dampers so as to enable an inner air intake mode, heater core bypass mode, and face mode, and operates the blower at high. Thereupon, water droplets adhering to an evaporator are blown away and removed by means of blown air from this blower.

13 Claims, 3 Drawing Sheets

AIR-CONDITIONING APPARATUS FOR VEHICLE USE

CROSS REFERENCE TO RELATED APPLICATIONS

This application is based upon and claims priority from Japanese Patent Application No. 5-301527 filed Dec. 1, 1993, the contents of which are hereby incorporated herein by reference.

BACKGROUND OF THE INVENTION

1. Field of the Invention

The present invention relates to an air-conditioning apparatus for vehicle use that allows elimination of water adhering to an evaporator fin.

2. Related Art

In an air-conditioning apparatus for vehicle use known as a car air conditioner, an evaporator, heater core, and the like are disposed within an air duct, and air within the vehicle or air outside the vehicle is sent to the evaporator or heater core by means of a blower and is blown within the vehicle as conditioned air.

In order to perform highly efficient heat exchange with the air inside the vehicle (recirculate) or the air outside the vehicle, an evaporator is structured by installing a large number of fins on a tube through which refrigerant passes. In the cooling operation of the evaporator, the surface temperature of the fins is at or below the dew-point temperature of air, and so moisture in the air becomes frost or water droplets and adheres to the fins. When frost or water droplets adhere to the fins, the clearance between the fins is narrowed, the amount of air flow may be reduced, odors may be generated, and corrosion may be caused.

Odor generation and corrosion due to water droplets are susceptible to worsening in the case where the air conditioner is stopped for long periods such as when the vehicle is parked, and with regard to odor in particular the direct effect of blowing air containing unpleasant odors into the interior of the vehicle when restarting the air conditioner is unpleasant, to say the least, to passengers in the vehicle. For this reason, it is desirable to take measures so that water droplets do not continue to adhere to the evaporator when the vehicle is parked.

Japanese Patent Application Laid-open No. 54-159759 discloses a device directed to eliminating water droplets from an evaporator. This device forms a water-repellent film on the evaporator fin surface, facilitating the movement of water droplets and improving the water-shedding performance of the fins. Thus, water droplets that do form on the fins are easily blown away by blown air from the blower so that water droplets do not remain on the fins while the air conditioner is stopped.

When an air conditioner is switched off, the blower fan is rotated for a short time by inertia, but because the amount of blown air thereof decreases suddenly, water droplets adhering to the evaporator when the air conditioner is switched off cannot be blown away by means of air blown from the blower. Additionally, frost adhering to the evaporator melts and becomes water droplets after the air conditioner is switched off, and these water droplets also remain without being removed from the evaporator. Consequently, even if a water-repellent film is formed on the fin surface, the reliability of water removal thereof is not sufficient to remove all the water droplets that can form on the evaporator.

SUMMARY OF THE INVENTION

In light of the above-described problems, it is an object of the present invention to provide an air-conditioning apparatus for vehicle use that can more reliably prevent water droplets from continuing to adhere to an evaporator after a vehicle's engine is hut down, such as when a vehicle is parked.

An air-conditioning apparatus for vehicle use according to the present invention for the purpose of attaining the foregoing object is provided with an evaporator and blower such that air sent by means of the blower passes through the evaporator to be blown into the interior of the vehicle. The device also includes a means that detects whether the vehicle is in a parked state, and a control means for operating the blower for a specified time interval when a parked state of the vehicle has been detected.

When the vehicle assumes a parked state, the blower is operated. For this reason, water droplets adhering to the evaporator are blown away by means of blown air from the blower. Additionally, frost that may adhere to the evaporator is melted by means of air blown from the blower. The frost then becomes water droplets, and is blown away from the evaporator.

BRIEF EXPLANATION OF THE DRAWINGS

These and other objects and features of the present invention will be understood from the following detailed description, the appended claims and drawings, all of which from a part of this application. In the drawings:

DETAILED DESCRIPTION OF THE PRESENTLY PREFERRED EXEMPLARY EMBODIMENT

A first embodiment of the present invention suited to an air-conditioning apparatus for vehicle use according to this invention will be described hereinafter with reference to the drawings.

Figure 2:
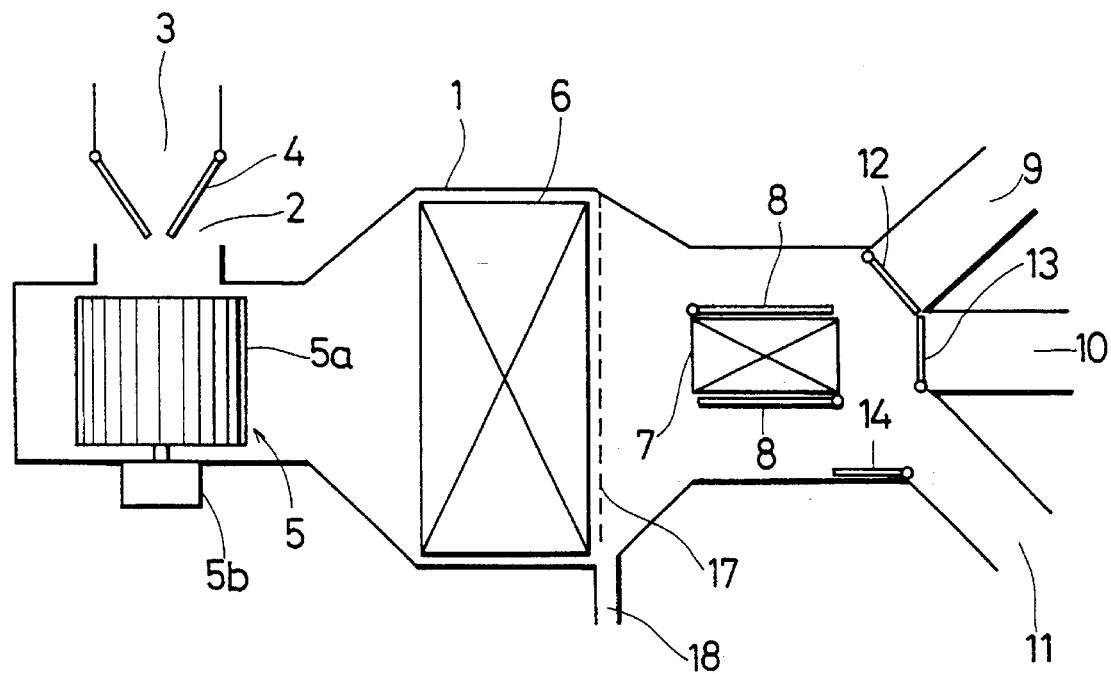
FIG. 2 is a sectional view indicating a structural schematic of an air-conditioning unit.

FIG. 2 indicates an air-conditioning unit. In this drawing, inner air intake port 2 and outer air intake port 3 as well as inner/outer air switching damper 4 are disposed at the most upstream side of air duct 1. Inner air intake port 2, outer air intake port 3, and air switching damper 4 are structured so that an intake mode can be switched to an inner air intake mode which draws in air within the vehicle from inner air intake port 2 or to an outer air intake mode which draws in air outside the vehicle from outer air intake port 3 by means of switching an open or closed state of inner/outer air switching damper 4. Blower 5, evaporator 6, and heater core 7 are disposed within air duct 1 from the upstream side to the downstream side, and on both the upper and lower sides of heater core 7 within air duct 1, air mix dampers are disposed to adjust the ratio of blown air passing through heater core 7 and blown air which bypasses this.

Figure 1:
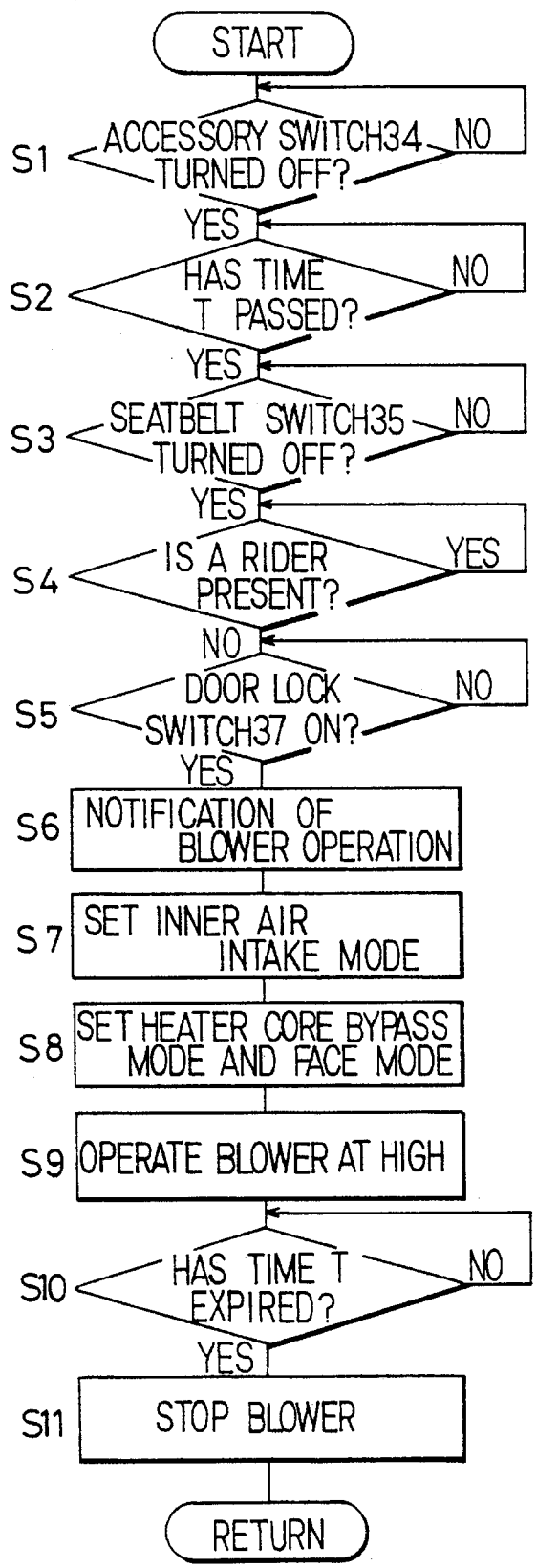
FIG. 1 is a flowchart indicating the control process according to a first embodiment of the invention.

At the most downstream side of air duct 1, defroster vent 9 for blowing conditioned air toward the vehicle's windshield is provided. Furthermore foot vent 10 for blowing conditioned air towards the feet of a vehicle rider, and face vent 11 for blowing conditioned air toward the face and chest of a vehicle rider are also disposed at the most downstream side of duct 1. Accordingly, vents 9 to 11 are provided with respective vent switching dampers 12 to 14, and are structured so as to allow a desired vent mode such as DEF mode, FOOT mode, BILEVEL mode or FACE mode to be obtained by means of switching the open state of dampers 12 to 14 from open to closed, or vice versa. FIG. 1 illustrates the state where switching damper 14 is open while switching dampers 12 and 13 are closed.

DEF mode is a mode wherein damper 12 for defroster vent 9 is opened and conditioned air is blown only from defroster vent 9, and FOOT mode is a mode wherein damper 13 for foot vent 10 is opened and conditioned air is blown only from foot vent 10. BILEVEL mode is a mode wherein dampers 13 and 14 for foot vent 10 and face vent 11, respectively, are opened, conditioned air which has passed through heater core 7 and been warmed is blown from foot vent 10, and conditioned air which has bypassed heater core 7 and is of comparatively low temperature is blown from face vent 11. FACE mode is a mode wherein damper 14 for face vent 11 is opened and conditioned air is blown only from face vent 11.

Figure 3:
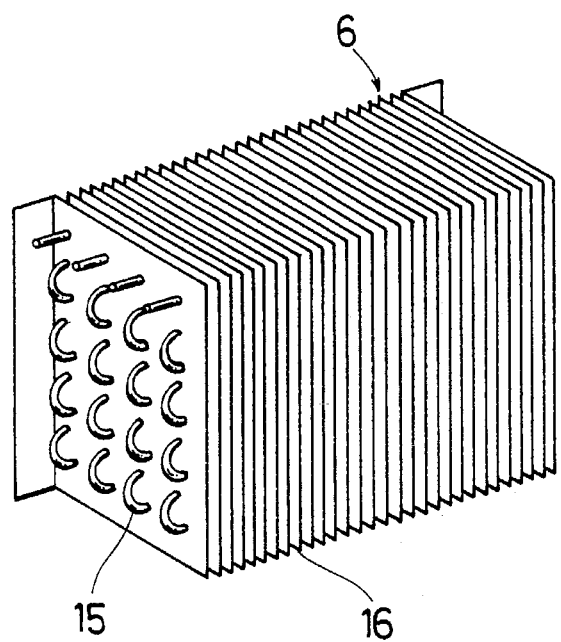
FIG. 3 is a perspective view of an evaporator.

As shown in for example FIG. 3, the foregoing evaporator 6 is structured with a plurality of plate fins 16 of aluminum composition installed on tubes 15 through which refrigerant passes, and air (wind) sent from blower 5 passes through spaces between adjacent plate fins 16 and passes through evaporator 6.

A water-repellent film is formed on the surfaces of tubes 15 and plate fins 16. By means of this water-repellent film, water droplets adhering to tubes 15 and plate fins 16 become susceptible to movement on the surfaces of tubes 15 and plate fins 16, and along with this the water-shedding performance of tubes 15 and plate fins 16 is enhanced, and the water droplets come to be easily blown away by means of air blown from blower 5. Accordingly, the structure further includes water-catching net 17 disposed on the downstream side of evaporator 6 within air duct 1, and water blown away from evaporator 6 is captured by means of water-catching net 17, allowed to drip to the bottom of air duct 1, and discharged to the exterior of the vehicle from water-discharge port 18 provided on the bottom of air duct 1.

Furthermore, the water-repellent film, formed on tubes 15 and plate fins 16, is formed by means of applying to the surface of plate fins 16 silicone resin, fluoride resin, paraffin, or a mineral oil such as petroleum jelly, or a mineral oil solution to which has been added a resinate such as stearic acid, or by means of dipping plate fins 16 into solutions thereof.

Figure 4:
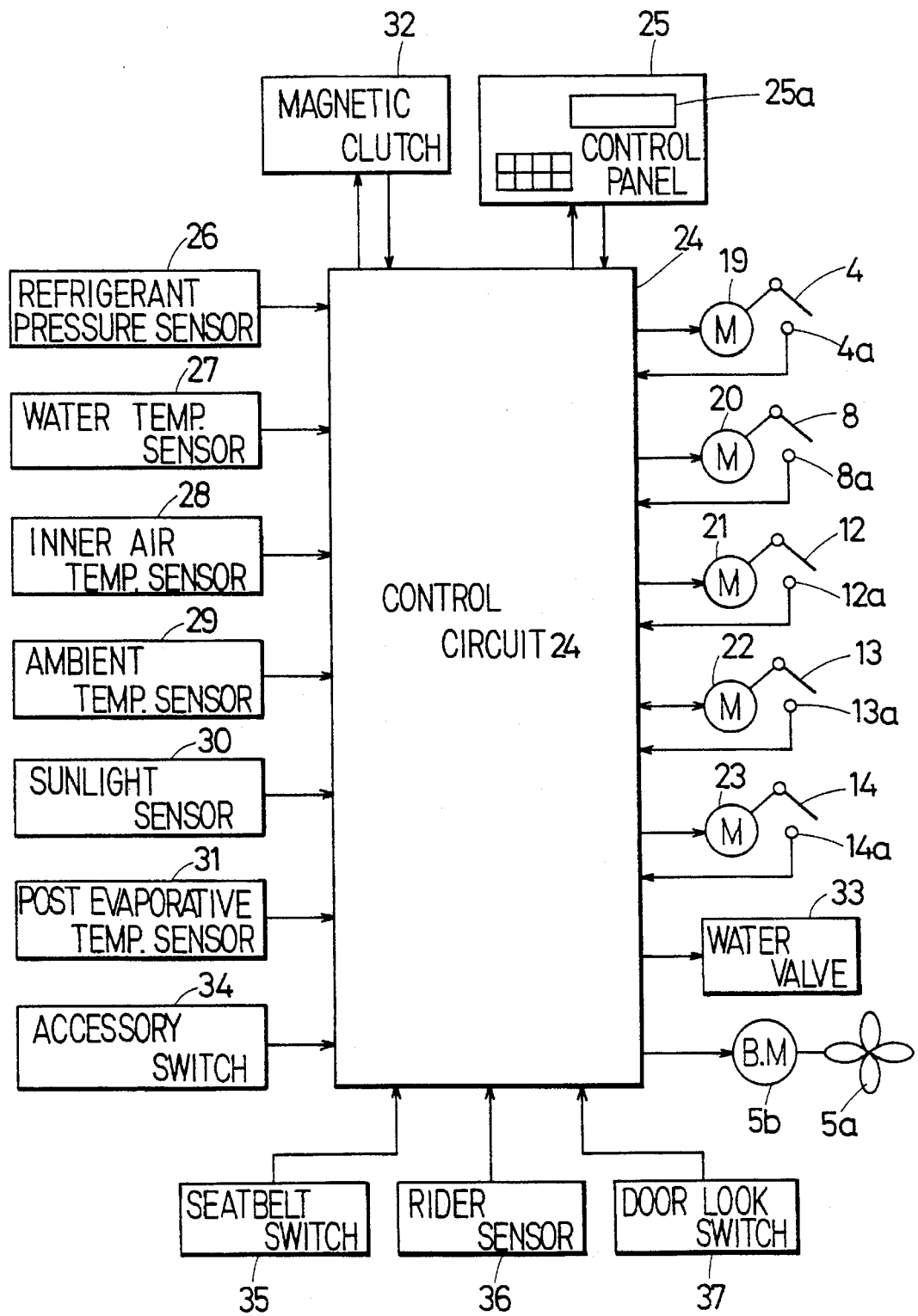
FIG. 4 is a block diagram indicating an electrical control structure of the embodiment of the present invention.

FIG. 4 depicts a control structure for an auto air conditioner. Inner/outer air switching damper 4, air-mix dampers 8, and vent switching dampers 12 to 14 operate with respective servomotors 19 to 23 as drive sources, and servomotors 19 to 23 are structured so as to be controlled by means of control circuit 24 as a control means which is composed primarily of a microcontroller. The structure is such that at this time, control circuit 24 receives, as feedback signals, detection signals from potentiometers 4a, 8a, and 12a to 14a that perform position detection for dampers 4, 8, and 12 to 14, respectively, and perform position control for the dampers 4, 8, and 12 to 14. Additionally, control circuit 24 is structured so as to control blower 5. Operation of the blower, in an auto air conditioner, is structured so as to allow switching of from four to thirty-two levels of high air flow to low air flow, and such that the operation switching thereof is performed by means of speed control by means of switching voltage applied to motor 5b which drives fan 5a.

However, in control circuit 24, signals are input from a set of operation devices provided in control panel 25, for example, various switches for selecting intake mode, selecting vent mode, setting interior temperature, switching a compressor for a refrigeration cycle on or off, switching the amount of air, and the like. Additionally, detection signals from refrigerant pressure sensor 26 that detects the pressure of refrigerant supplied to evaporator 6, water temperature sensor 27 that detects the temperature of engine coolant water supplied to heater core 7, inner air temperature sensor 28 that detects the temperature of air inside the vehicle, ambient air temperature sensor 29 that detects the temperature of air outside the vehicle, sunlight sensor 30 that detects the strength of sunlight, and post-evaporator temperature sensor 31 that detects the temperature of air immediately after passing through evaporator 6 in air duct 1 are input to control circuit 24.

With regard to the intake mode and vent mode, control circuit 24 controls servomotors 4a and 12a–14a for inner/outer air switching damper 4 and vent dampers 12 to 14, respectively, setting to the established mode by means of the operation devices of control panel 25. In addition, with regard to the temperature of conditioned air controlled by control circuit 24, on the basis of detection signals from sensors 26 to 31, magnetic clutch 32 linking the refrigeration cycle compressor to the engine, water valve 33 controlling the amount of coolant water supplied to heater core 7, and servomotor 8a for air-mix damper 8, adjust to the temperature established by means of the operation devices of control panel 25.

In addition to the various input signals described above, signals are input to control circuit 24 from accessory switch 34 of the ignition switch mechanism, seatbelt switch 35 that detects wearing of a seatbelt, rider sensor 36 that detects a rider in the vehicle, and door-lock switch 37. Control circuit 24 is structured so as to detect the parked state of the vehicle by means of signals from accessory switch 34, seatbelt switch 35, rider sensor 36, and door-lock switch 37. Accordingly, when it is detected that the vehicle is an a parked state, control circuit 24 operates blower 5 as will be described later, and the structure is such that notification of the execution of operation of the blower is made by means of a notification device such as for example a buzzer, chime, speech-generation device, or indicator provided on control panel 25.

Rider sensor 36 may be a pressure sensor that detects the size of a load placed on the seat, a switch which is switched on or off in accordance with flexing of the seat, a sensor which detects the seating of a person on the seat by means of infrared light or ultrasound waves, a CCD camera which images a person seated on the seat, or the like.

Next, operation according to the foregoing structure in a case where the vehicle is parked will be described below with reference to the flowchart pictured in FIG. 1.

Now, if it is assumed that the vehicle has been driven while operating the air conditioner, then when blown air from blower 5 passes through evaporator 6 during operation of the air conditioner, moisture contained in the air thereof becomes water droplets or frost and adheres to tubes 15 and plate fins 16 of evaporator 6. Of these, water droplets are blown away by blown air from blower 5 and are discharged to the exterior of the vehicle from water-discharge port 18.

It is then assumed that, in order to park, the air conditioner has been switched off, the ignition switch device has been switched off (i.e., the engine has been stopped), and the key has been removed from the key cylinder of the ignition switch device. When the air conditioner is switched off, fan 5a of blower 5 continues to rotate due to inertia for a short time, but because the amount of air blown thereby decreases suddenly, frost and also water droplets adhere to the tubes 15 and plate fins 16 of evaporator 6 when the air conditioner is switched off and are not blown away by means of blown air from the blower 5, and remain adhering to tubes 15 and plate fins 16. However, the frost and water droplets are removed from tubes 15 and plate fins 16 in the following manner.

Briefly, when the ignition switch device is switched off, accessory switch 34 is also switched off, and so the control circuit 24 decides "YES" in step S1 of FIG. 1. In step S2, time t is counted (for example 60 seconds). In the interval that this control circuit 24 is counting time t, the rider sets the shift lever for the transmission in the "PARK" position and also operates the hand brake to put the vehicle in a braked state, then unfastens the seatbelt (switching seatbelt switch 35 off), vacates the seat to outside the vehicle and locks the door (detecting "NO RIDER" for rider sensor 36 and switching door-lock switch 37 on).

When time t has elapsed after accessory switch 34 has been switched off, control circuit 24 decides "YES" in step S2, then subsequently executes step S3 to decide whether seatbelt switch 35 has been switched off. Step S4 decides whether the output signal of rider sensor 36 indicates that a rider is present or absent. Step S5 decides whether door-lock switch 37 has been switched on. Here, because the rider has already exited the vehicle and the door is in a locked state, control circuit 24 decides "YES (seatbelt unfastened)" in step S3, decides "NO RIDER" in step S4, and decides "YES (door locked)" in step S5.

If the result of step S5 is "YES", control circuit 24 detects that the vehicle is in a parked state, then in step S6, control circuit 24 notifies, by means of notification device 25a on control panel 25, that blower 5 will be operated in order to remove water droplets adhering to evaporator 6. Accordingly, in step S7, control circuit 24 drives servomotor 19 for inner/outer air switching damper 4 and switches the intake mode to the inner air intake mode. In step 8S, control circuit 24 drives servomotor 20 for air-mix damper 8 and sets a state whereby all air bypasses heater core 7 (heater core bypass mode), and further drives servomotors 21–23 for respective vents 10–12 and sets the vent mode to face mode, with this state is depicted in FIG. 2.

Thereafter, control circuit 24 transfers execution to step S9 where operation of the blower 5 starts at "HIGH", i.e., maximum air flow. Step S10 counts a fixed time T, for example 10 to 30 seconds. Thus, due to the operation of blower 5, air within the vehicle is made to be drawn into air duct 1 from inner air intake port 2, pass through evaporator 6, and be expelled into the vehicle from face vent 11. As the air moved by blower 5 passes through evaporator 6, water droplets adhering to tubes 15 and plate fins 16 are blown away. Additionally, frost adhering to tubes 15 and plate fins 16 of evaporator 6 is melted and becomes water droplets, which are likewise blown away by means of air blown by blower 5. Accordingly, the water droplets blown away from evaporator 6 are captured by water-catching net 17 and are discharged to the exterior of the vehicle from water-discharge port 18. After operation of blower 5 has performed for fixed time T, control circuit 24 decides "YES" in step S10, and stops operation of blower 5 in step S11.

According to this embodiment, when a vehicle is placed in a parked state, blower 5 is operated for only fixed time T, and water droplets adhering to evaporator 6 are blown away by means of air blown by blower 5. As well as removing water droplets from evaporator 6, frost is melted from evaporator 6, with the frost turning into water droplets that are then blown away by blower 5. Thus, water droplets are not allowed to remain adhering to evaporator 6 when the vehicle is parked and shut off. Since water droplets do not continue to adhere to evaporator 6, there is a decrease in the amount of corrosion of tubes 15 and plate fins 16 caused by water droplets adhering to evaporator 6. Furthermore, the emission of odors into the passenger compartment due to the water droplets adhering to evaporator 6 is prevented, thus preventing the venting through the air conditioning system of unpleasant odors when the air conditioner is restarted.

In blowing away water droplets from evaporator 6, the more rapid the speed of the air passing through evaporator 6, the greater the water-droplet removal effect will be. To raise the speed of the air passing through evaporator 6, it is preferable to operate blower 5 at high as well as making the air resistance of the air-conditioning unit as small as possible. With regard to air resistance of the air-conditioning unit, intake resistance is less when inner air is taken in directly from inner air intake port 2 than when air outside the vehicle is taken in from outer air intake port 3 via an outer air intake passage (not illustrated), and for the face mode is used as the vent mode having the least vent resistance. Additionally, flow resistance is less when blown air from blower 5 is made to bypass heater core 7 than when made to pass through heater core 7. In light of such circumstances as these, according to the present embodiment, during operation for water-droplet removal the intake mode is made to be the inner air intake mode, the vent mode is made to be the face mode, and air-mix damper 8 is set to the heater-core bypass mode. In this manner, the air-conditioning unit is placed in a state of minimum air resistance and large amounts of air are made to be sent from blower 5. Thus, blown air from blower 5 can be made to pass at high speed with respect to evaporator 6, and water droplets can be removed from evaporator 6 even more reliably.

Furthermore, when blower 5 is operated in order to remove water droplets, notification thereof (step 6) is made by means of notification device 25a according to this embodiment. This makes it possible to alleviate any inconvenience or unpleasantness for the rider due to a powerful wind being suddenly blown from the face vent, especially in the event that control circuit 24 recognizes a parked state of the vehicle and initiates operation of blower 5 despite a rider remaining within the vehicle.

To alleviate this inconvenience or unpleasantness for the rider, a buzzer, chime, or speech-generation device is preferable as notification device 25a. It is also acceptable to provide notification of the operation of blower 5 by means of an indicator that illuminates simultaneously with a sound, such as a bell, chime, or speech notification.

Additionally, a notification device is not exclusively limited to a device provided on control panel 25. It is equally possible that a notification device be disposed on a meter panel, which also indicates such things as vehicle speed, engine speed, etc.

Moreover, according to this embodiment, operation time T of blower 5 for removing water droplets has been established as falling within the range of from about ten to about thirty seconds. However, it is also acceptable to establish operation time T as being thirty seconds or more in order to evaporate and dry water droplets that could not be blown away, thus more completely eliminating moisture from evaporator 6. Also, blower 5 may be operated at a medium or low level for a longer operation time T. Also, blower 5 may be operated in modes other than the inner air intake mode, heater core bypass mode, and face mode.

In addition, according to this embodiment, the process for determining that the vehicle has been parked is initiated on the condition that the accessory switch 34 has been switched off. In the case where a switch for detecting insertion of a key into the key cylinder of the ignition switch device has been provided, it is also possible to initiate the vehicle parked determination operation after a key-insertion detection switch, instead of accessory switch 34, detects extraction of the key.

Furthermore, according to the foregoing embodiment, a parked state is detected by means of signals from seatbelt switch 35, rider sensor 36, and door-lock switch 37. However, a structure may be employed that detects a parked state from any one of these signals. Additionally, in a vehicle having a switch for detecting that the shift lever for the transmission has been set to the parked position, or in a vehicle provided with a transmitter device which transmits air-propagating signals such as radio waves, ultrasound waves, or infrared light to the ignition switch device and can lock the door by means of the transmitted signals, a structure can be used which detects the parked state of the vehicle based upon whether the parking position detection switch is on or whether the door has been locked by means of the air-propagating signal.

In a vehicle not provided with either seatbelt switch 35, rider sensor 36, door-lock switch 37, parking detection switch, or the like, a structure can be used which operates blower 5 after a predetermined period of time t following the switching off of the accessory switch 34, and thus of the engine, has elapsed.

Additionally, according to the foregoing embodiment a water-repellent film is formed on tubes 15 and plate fins 16 of evaporator 6. However, it is also possible that no water-repellent film is provided.

The present invention is not limited to the above-described embodiment and the embodiment pictured in the drawings. For example, the foregoing embodiment was described in connection with an automotive air conditioner that automatically adjusts conditioned air flow to a preset temperature, such as with automatic climate control, but the present invention can be applied to an air-conditioning apparatus for vehicle use provided with at least an evaporator, which is known as a general air conditioner or car cooler, and can be embodied with various changes which do not depart in essence from the scope of the invention.

As has been described above, in an air-conditioning apparatus for vehicle use according to the present invention, a blower is operated when the vehicle is placed in a parked state. Thus, water droplets adhering to an evaporator are blown away by means of air from a blower. Furthermore, any frost that might adhere to the evaporator melts into water droplets, which are similarly blown away. Hence, any problems such as the advance of corrosion of the evaporator tubes and fins due to water droplets adhering to the evaporator as well as emission of unpleasant odors caused by water droplets adhering to the evaporator for a lengthy period of time between uses of the vehicle.

This invention has been described in connection with what is presently considered to be the most practical and preferred embodiment of the present invention. However, this invention is not to be limited to the disclosed embodiment, but rather is intended to cover all modifications and equivalent arrangements included within the spirit and scope of the appended claims.

What is claimed is:

1. An air-conditioning system comprising:

an air passage having an air intake port and at least one air outlet port;

means for moving air at a predetermined flow rate from said intake port to said outlet port, said moving means being disposed in said air passage;

an evaporator disposed within said air passage for conditioning said moving air;

means for determining whether power to said air conditioning system has been terminated;

means for continued operation of said moving means at at least said predetermined flow rate for a predetermined period of time before power to said air conditioning system has been terminated, wherein said air conditioner is for use in a vehicle, wherein said moving meads is a blower disposed in said air passage, and wherein said determining means includes means for sensing presence of a rider in said vehicle, means for detecting whether a seatbelt is unfastened, and second means for detecting whether a car door has been locked.

2. An air-conditioning apparatus for vehicle use according to claim 1, wherein said evaporator is provided with a plurality of tubes which allow refrigerant to pass, and with fins disposed between these tubes, and wherein a water-repellent film is formed on the surfaces thereof.

3. An air-conditioning apparatus for vehicle use according to claim 1, wherein the amount of blown air of said blower is controlled at multiple stages and, when a parked state of the vehicle has been detected by said parking detection means, said blower control means drives said blower to produce a maximum air amount.

4. An air-conditioning apparatus for vehicle use according to claim 1, further comprising a water-catching net is disposed on a downstream side surface of said evaporator.

5. An air-conditioning apparatus for vehicle use according to claim 1, wherein one end of said air duct is provided with an inner air intake port which introduces passenger compartment air, an outer air intake port which introduces air outside the vehicle, and an inner/outer air switching damper which switches between these two intake ports, said inner/outer air switching damper opens said inner air intake port when a parked state of the vehicle has been detected by said parking detection means.

6. An air-conditioning apparatus for vehicle use according to claim 1, further comprising a heater core which heats chilled air and disposed downstream of said evaporator within said air duct.

7. An air-conditioning apparatus for vehicle use according to claim 6, further comprising an air-mix damper which regulates the amount of air bypassing said heater core after passing through said evaporator and the amount of air passing through said heater core and disposed within said air duct, said air-mix damper performing control such that all air passing through the evaporator bypasses said heater core when a parked state of the vehicle has been detected by said parking detection means.

8. An air-conditioning apparatus for vehicle use according to claim 1, further comprising a notification means for informing a rider when a parked state of the vehicle has been detected by said parking detection means and said blower is driven.

9. An air conditioner as claimed in claim 1, wherein when said sensing means senses no passenger in said vehicle, when said detecting means detects that said seatbelt is not fastened, and when said second detecting means detects that said car door is locked, said means for continued operation of said blower continues to cause said blower to move air towards said evaporator in order to remove water droplets therefrom.

10. An air conditioner as claimed in claim 1, wherein said means for continued operation of said moving means includes a control circuit and a plurality of sensors that control said control circuit so that said control circuit continues to drive said moving means.

11. An air conditioner as claimed in claim 10, wherein said plurality of sensors include at least one of a seatbelt sensor, a rider sensor, and a door lock sensor.

12. A method for removing water droplets from an evaporator using air moved by a blower of an automotive air conditioner, said method comprising the steps of:

determining when said vehicle is put into a parked state; and driving said blower at at least a predetermined flow rate for a predetermined time after said vehicle has been put into said parked state, wherein said determining step includes the steps of:

waiting a second predetermined time after an engine of said vehicle has been stopped;

detecting whether a seatbelt remains fastened in said vehicle;

detecting whether a rider is present in said vehicle;

detecting whether a door of aid vehicle is locked; and then determining whether said vehicle is in a parked state.

13. A method for removing water droplets from an evaporator as claimed in claim 12, wherein said driving step occurs only after said first detecting step indicates that no seatbelt is fastened, said second detecting step indicates that no rider is present in said vehicle, and said third detecting step indicates that said door of said vehicle is locked.

\* \* \* \* \*